United States Patent
Park et al.

(10) Patent No.: US 11,499,874 B2
(45) Date of Patent: Nov. 15, 2022

(54) TEMPERATURE SENSOR INCLUDING DIODE AND CAPACITOR

(71) Applicants: Samsung Electronics Co., Ltd., Suwon-si (KR); INDUSTRY-ACADEMIC COOPERATION FOUNDATION, YONSEI UNIVERSITY, Seoul (KR)

(72) Inventors: Sungsik Park, Seoul (KR); Youngcheol Chae, Seoul (KR)

(73) Assignees: SAMSUNG ELECTRONICS CO., LTD., Gyeonggi-Do (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 163 days.

(21) Appl. No.: 16/863,216

(22) Filed: Apr. 30, 2020

(65) Prior Publication Data

US 2021/0063250 A1     Mar. 4, 2021

(30) Foreign Application Priority Data

Sep. 3, 2019     (KR) .................. 10-2019-0108940

(51) Int. Cl.
G01K 7/34     (2006.01)
G01K 7/01     (2006.01)

(52) U.S. Cl.
CPC .............. *G01K 7/34* (2013.01); *G01K 7/01* (2013.01); *G01K 2217/00* (2013.01)

(58) Field of Classification Search
USPC ....................................... 374/173, 184, 178
See application file for complete search history.

(56) References Cited

U.S. PATENT DOCUMENTS 5,982,221 A * 11/1999 Tuthill .................. H01L 23/34
                                                        327/512
6,869,216 B1 * 3/2005 Holloway .............. G01K 1/028
                                                        374/170

(Continued)

FOREIGN PATENT DOCUMENTS

EP     2505978 A1 * 10/2012 ............... G01K 7/01
EP     3657651 A1 *  5/2020 ............. G01K 13/20

OTHER PUBLICATIONS

Hellen, "Verifying the diode-capacitor circuit voltage decay", American Journal of Physics, vol. 71, No. 8, Aug. 2003.

(Continued)

*Primary Examiner* — Mirellys Jagan
(74) *Attorney, Agent, or Firm* — Harness, Dickey & Pierce, P.L.C.

(57) ABSTRACT

A temperature sensor configured to generate an output signal corresponding to a sensed and/or measured temperature includes: a diode including a cathode coupled to a ground node; a first capacitor including a first end coupled to the ground node; a switch circuit configured to connect a second end of the first capacitor to a positive voltage node or an anode of the diode according to a control signal; switch control circuitry configured to generate the control signal based on a reference voltage with a voltage of the anode; and an output signal generator configured to generate the output signal corresponding to the sensed temperature based on a frequency of the control signal.

19 Claims, 20 Drawing Sheets

(56) References Cited

U.S. PATENT DOCUMENTS

| | | |
|---|---|---|
| 6,970,393 B1 | 11/2005 | Cho et al. |
| 7,648,271 B2 | 1/2010 | Doorenbos et al. |
| 8,115,559 B2 | 2/2012 | Kim et al. |
| 9,810,584 B2 | 11/2017 | Kohola et al. |
| 10,190,922 B2 | 1/2019 | Eberlein |
| 2004/0252749 A1 | 12/2004 | Randazzo |
| 2006/0193370 A1* | 8/2006 | St. Pierre .................. G01K 7/01 374/178 |
| 2013/0070807 A1 | 3/2013 | Ponomarev et al. |
| 2014/0086278 A1* | 3/2014 | Welland .................... G01K 7/01 374/183 |
| 2018/0245992 A1 | 8/2018 | Kim |
| 2018/0328792 A1 | 11/2018 | Zhu et al. |
| 2019/0041272 A1 | 2/2019 | Eberlein |
| 2019/0086272 A1 | 3/2019 | Xia et al. |
| 2019/0094079 A1 | 3/2019 | Elsayed et al. |
| 2019/0113393 A1* | 4/2019 | Sato ...................... H03K 17/602 |
| 2019/0131928 A1 | 5/2019 | Rachala et al. |

OTHER PUBLICATIONS

Souri, et. al. "A 0.85V 600nW all-CMOS temperature sensor with an inaccuracy of ±0.4° C. (3s) from -40 to 125° C.", Institute of Electrical and Electronics Engineers Inc. 2014.

Pertijs, et, al. "A CMOS Smart Temperature Sensor With a 3σ Inaccuracy of ±0.1 ° C. From -55° C. to 125° C.", IEEE Journal of Solid-State Circuits, vol. 40, No. 12, 2005.

Kim et, al. "A 0.02mm² embedded temperature sensor with ±2° C. inaccuracy for self-refresh control in 25nm mobile DRAM", IEEE Computer Society, 2015.

Annema, "Low-Power Bandgap References Featuring DTMOST's" IEEE Journal of Solid-State Circuits, vol. 34, No. 7, 1999.

* cited by examiner

TEMPERATURE SENSOR INCLUDING DIODE AND CAPACITOR

CROSS-REFERENCE TO RELATED APPLICATION

This U.S. non-provisional application claims the benefit of Korean Patent Application No. 10-2019-0108940, filed on Sep. 3, 2019, in the Korean Intellectual Property Office, the disclosure of which is incorporated herein in its entirety by reference.

BACKGROUND

Various example embodiments of the inventive concepts relate to a temperature sensor, and more particularly, to a temperature sensor including a diode and a capacitor, and/or a temperature sensing method.

The temperature sensor may be used to measure and/or obtain a temperature in various applications. For example, devices included in an integrated circuit may have temperature dependent properties, and a temperature sensor may be used to compensate for the properties of the devices as the temperature changes. In addition, a plurality of temperature sensors may be arranged in the integrated circuit to control heat generation of the integrated circuit. Accordingly, a temperature sensor with desirable properties such as high accuracy, a high resolution, a wide measurement range, low power consumption, and a small area may be desired.

SUMMARY

Various example embodiments of the inventive concepts provide for a temperature sensor that provides high accuracy and has a simple structure.

According to an aspect of at least one example embodiment of the inventive concepts, there is provided a temperature sensor configured to generate an output signal corresponding to a sensed temperature, the temperature sensor including: a diode including a cathode coupled to a ground node, a first capacitor including a first end coupled to the ground node, a switch circuit configured to connect a second end of the first capacitor to a positive voltage node or an anode of the diode based on a control signal, switch control circuitry configured to generate the control signal based on a reference voltage and a voltage of the anode of the diode, and an output signal generator configured to generate the output signal based on a frequency of the control signal.

According to an aspect of at least one example embodiment of the inventive concepts, there is provided a temperature sensor configured to generate an output signal corresponding to a sensed temperature by switching between a first phase and a second phase, the temperature sensor including: a first capacitor and a diode, a first switch circuit configured to charge the first capacitor with a positive voltage in the first phase and discharge the first capacitor through the diode in the second phase, a reference voltage generator configured to generate a reference voltage independent of the discharge of the first capacitor, switch control circuitry configured to control the first switch circuit and terminate the second phase based on the discharge voltage of the first capacitor and the reference voltage, and an output signal generator configured to generate the output signal corresponding to the sensed temperature based on a duration of the second phase.

According to an aspect of at least one example embodiment of the inventive concepts, there is provided a temperature sensor configured to generate an output signal corresponding to a sensed temperature by switching between a first phase and a second phase, the temperature sensor including: a plurality of switches and a diode, a first capacitor configured to be charged with a positive voltage during the first phase, and discharged through the diode during the second phase, by at least one of the plurality of switches, a second capacitor configured to be discharged through the diode during the first phase, and charged with the positive voltage during the second phase, by at least one of the plurality of switches, switch control circuitry configured to maintain a duration of the first phase, and terminate the second phase, based on a reference voltage and a voltage of the first capacitor, and an output signal generator configured to generate the output signal corresponding to the sensed temperature based on a duration of the second phase.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
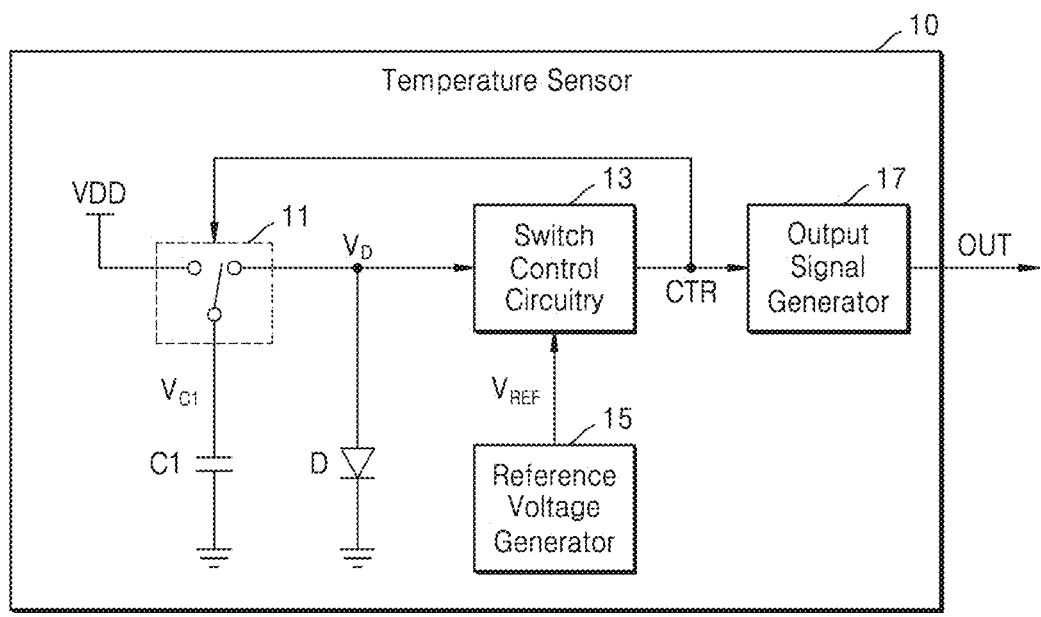
FIG. 1 is a block diagram of a temperature sensor according to at least one example embodiment.

FIG. 1 is a block diagram of a temperature sensor 10 according to at least one example embodiment. The temperature sensor 10 may sense an ambient temperature and generate an output signal OUT corresponding to the sensed temperature. As shown in FIG. 1, the temperature sensor 10 may include a first capacitor C1, a diode D, a first switch circuit 11, switch control circuitry 13, a reference voltage generator 15, and/or an output signal generator 17, but is not limited thereto and may include a greater or lesser number of constituent components. In some example embodiments, at least one of the components of the temperature sensor 10 may be manufactured by a semiconductor process. In addition, in some example embodiments, the temperature sensor 10 may also be included in an integrated circuit manufactured by the semiconductor process.

The first capacitor C1 may have a first end coupled to a ground node to which a ground potential is applied, and a second end coupled to the first switch circuit 11. The diode D may have a cathode coupled to the ground node and an anode coupled to the first switch circuit 11. The first switch circuit 11 may be coupled to the first capacitor C1, the diode D, and a positive voltage node to which a positive supply voltage VDD is applied, but is not limited thereto. Herein, connection to the positive voltage node to which the positive supply voltage VDD is applied may simply be referred to as connection to the positive supply voltage VDD, and connection to the ground node to which the ground potential is applied may simply be referred to as a ground potential.

The first switch circuit 11 may include at least one switch, and may connect the first capacitor C1 to one of the positive supply voltage VDD and the diode D according to a control signal CTR provided from the switch control circuitry 13. For example, the first switch circuit 11 may connect the first capacitor C1 to the positive supply voltage VDD in response to a first desired voltage level (e.g., a high level voltage, etc.) of the control signal CTR, and may connect the first capacitor C1 to the diode D, that is, an anode of the diode D in response to a second desired voltage level (e.g., a low level voltage) of the control signal CTR, or vice versa, etc. Herein, the "ON" state of the switch may refer to a state in which both ends of the switch are electrically connected to each other, and the "OFF" state of the switch may refer to a state in which both ends of the switch are electrically disconnected from each other. Also, two or more components electrically connected via the ON switch may be referred to as simply connected to each other, and two or more components that are always electrically connected to each other through a conducting wire or the like may be referred to as simply coupled to each other.

In a period in which the first capacitor C1 is connected to the positive supply voltage VDD (hereinafter referred to as a charge period, a reset period, a first phase, etc.), the first capacitor C1 may be charged with the positive supply voltage VDD. However, in a period in which the first capacitor C1 is connected to the diode D (hereinafter referred to as a discharge period, a second phase, etc.), the first capacitor C1 may be discharged through the diode D. Accordingly, a voltage $V_{C1}$ of the second end of the first capacitor C1 (hereinafter referred to as a first capacitor voltage) may be maintained at the positive supply voltage VDD and then gradually reduced by a discharge current passing through the diode D. As described below with reference to FIGS. 2A and 2B, while the first capacitor C1 is discharged through the diode D, a diode voltage $V_D$ (or the first capacitor voltage $V_{C1}$) may decrease independently of the voltage at which the discharge is started, that is, the positive supply voltage VDD, and may decrease differently with and/or based on the temperature.

The switch control circuitry 13 may generate the control signal CTR based on the diode voltage $V_D$ with a reference voltage $V_{REF}$ and/or by comparing the diode voltage $V_D$ with a reference voltage $V_{REF}$. For example, when the diode voltage $V_D$ becomes lower than the reference voltage $V_{REF}$, the switch control circuitry 13 may generate the control signal CTR such that the first switch circuit 11 connects the first capacitor C1 to the positive supply voltage VDD, and after a desired and/or certain period of time has elapsed, may generate the control signal CTR such that the first switch circuit 11 connects the first capacitor C1 to the diode D, but the example embodiments are not limited thereto. An example of the switch control circuitry 13 will be described later with reference to FIG. 3.

The reference voltage generator 15 may generate the reference voltage $V_{REF}$ (e.g., a threshold voltage) to be compared with the diode voltage $V_D$ by the switch control circuitry 13. The reference voltage generator 15 may generate, as a reference voltage $V_{REF}$, a voltage of a desired and/or certain magnitude, that is, a DC voltage of a desired voltage level in some example embodiments, may generate a voltage that varies over time in some example embodiments, and/or may generate a voltage that varies with the temperature and/or is based on the temperature in some example embodiments. Examples of the reference voltage generator 15 will be described below with reference to FIGS. 10A, 10B, 10C, and 11.

The output signal generator 17 may receive the control signal CTR from the switch control circuitry 13 and generate the output signal OUT from and/or based on the control signal CTR. In some example embodiments, the output signal generator 17 may measure a frequency of the control signal CTR and generate the output signal OUT based on the measured frequency, but is not limited thereto. In some example embodiments, the output signal OUT may be a digital signal having a value corresponding to a sensed temperature. An example of the output signal generator 17 will be described later with reference to FIG. 14.

As described above, the temperature sensor 10 may have a simple structure, and circuits of a complicated structure such as an analog-to-digital converter, a successive application register (SAR), a capacitor array, a charge pump, and the like may be omitted. In addition, as described below with reference to FIGS. 2A and 2B, the temperature sensor 10 may provide a wide temperature measurement range and high resolution due to capacitor-diode discharge characteristics, thereby providing accurate temperature readings.

Figure 2A:
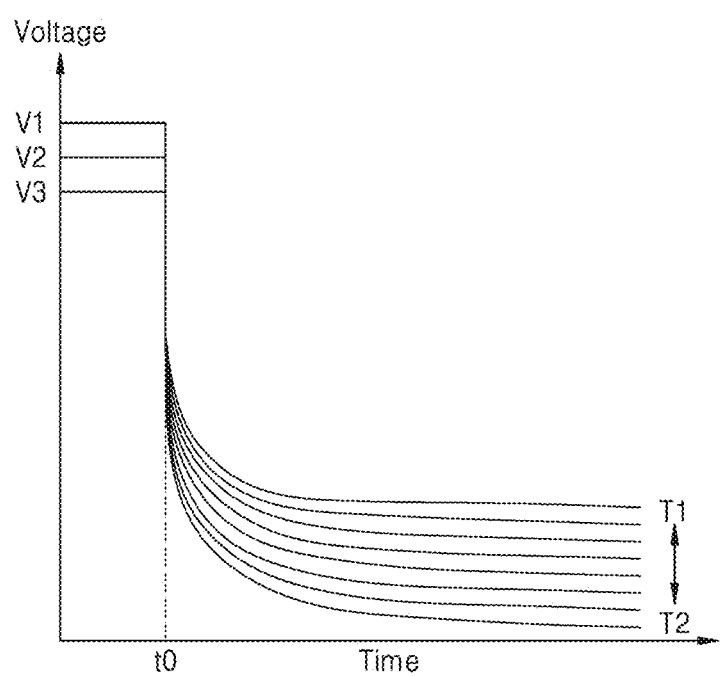
FIGS. 2A and 2B are graphs illustrating capacitor-diode discharge characteristics according to at least one example embodiment.
Figure 2B:
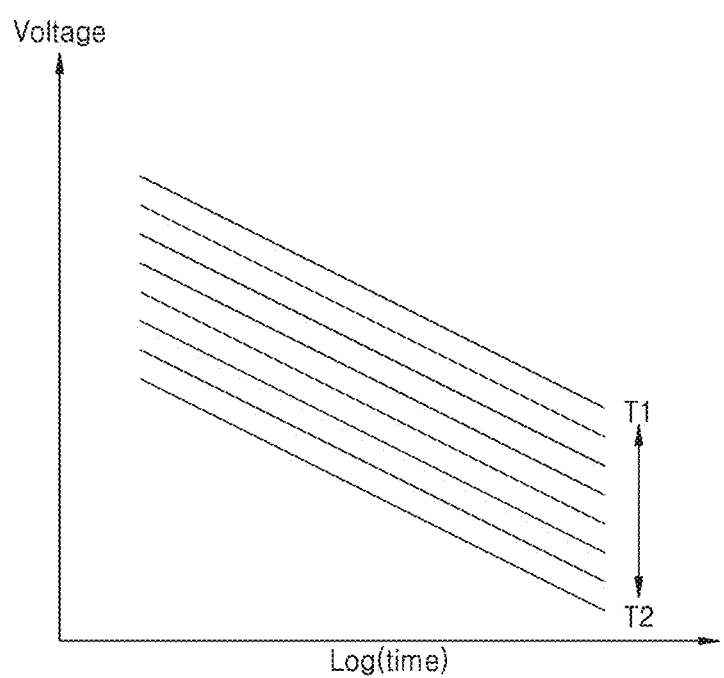

FIGS. 2A and 2B are graphs illustrating capacitor-diode discharge characteristics according to at least one example embodiment. In more detail, the graph of FIG. 2A shows a change in the first capacitor voltage $V_{C1}$ of FIG. 1 over time at different magnitudes of the positive supply voltage VDD and different temperatures, and the graph of FIG. 2B shows a change in the first capacitor voltage $V_{C1}$ at different temperatures on a time axis of a logarithmic scale. Hereinafter, FIGS. 2A and 2B will be described with reference to FIG. 1.

Referring to FIG. 2A, the first switch circuit 11 may connect the first capacitor C1 to the positive supply voltage VDD until time t0, and may connect the first capacitor C1 to the diode D after time t0. Accordingly, the first capacitor voltage $V_{C1}$ may be maintained at the positive supply voltage VDD until time t0, and may gradually decrease after time t0. Herein, a change in the first capacitor voltage $V_{C1}$ due to the discharge of the first capacitor C1 through the diode D may be referred to as a discharge curve of the first capacitor C1.

In some example embodiments, the first capacitor voltage $V_{C1}$ may be constantly discharged independent of the magnitude of the charged voltage. For example, as shown in FIG. 2A, the first capacitor C1, even when charged to voltages of different magnitudes, such as a first voltage V1, a second voltage V2, and a third voltage V3, etc., may have the same discharge curve at the same temperature after time t0. In other words, if the diode D and the first capacitor C1 are maintained at a first temperature, the first capacitor C1 has the same discharge curve irrespective of the starting voltage of the first capacitor C1. Accordingly, even when the positive supply voltage VDD for charging the first capacitor C1 varies due to various causes, for example, a decrease in an output voltage of a battery due to aging of the battery, etc., the first capacitor voltage $V_{C1}$ may be constantly reduced, and thus characteristics of the temperature sensor 10 may be maintained.

The discharge curve of the first capacitor C1 may depend on the temperature of the diode D and the first capacitor C1. For example, as shown in FIG. 2A, the discharge curve of the first capacitor C1 at a relatively low first temperature T1 may correspond to a higher voltage than at a relatively high second temperature T2, etc. Herein, the first temperature T1 may refer to a temperature lower than the second temperature T2 (T1<T2), but is not limited thereto. As described below with reference to FIGS. 12 and 13, the discharge curve of the first capacitor C1 may vary depending on the magnitude of the diode D and/or the number of diodes coupled in series at a constant temperature.

Referring to FIG. 2B, the discharge curve of the first capacitor C1 may be reduced logarithmically. According to Edward H Hellen, "Verifying the diode-capacitor circuit voltage decay", American Journal of Physics, August, 2003, incorporated herein by reference, the discharge curve, that is the diode voltage $V_D$ in the discharge period, may be expressed as Equation 1 below as a function of time t.

$$V_D(t) = -mV_T \cdot \ln\left(\frac{-I_S}{C \cdot mV_T} \cdot t\right) \qquad \text{[Equation 1]}$$

In Equation 1, $I_S$ is a current passing through the diode D, $V_T$ is a value (e.g., kT/q=$V_T$=25 mV) determined by elementary charge q, Boltzmann constant k, and temperature T, C is a capacitance of the first capacitor C1, and m is a constant. Accordingly, discharge curves may vary over a wide temperature range and may be distributed uniformly in the temperature range, for example, linearly with temperature changes, as shown in FIG. 2B. As a result, a temperature measurement range and resolution of the temperature sensor 10 may be improved.

Figure 3:
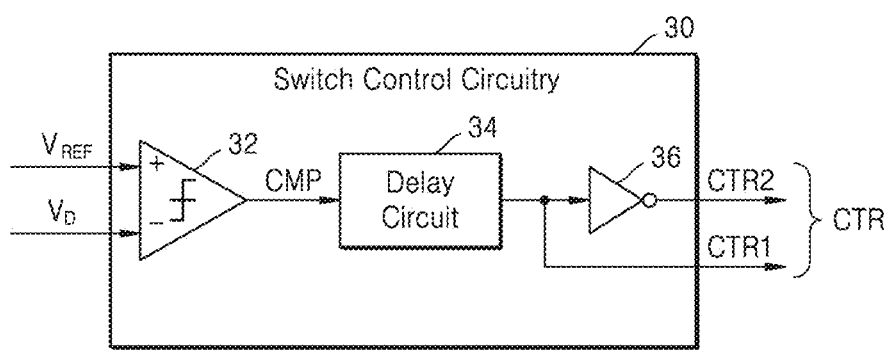
FIG. 3 is a block diagram of switch control circuitry according to at least one example embodiment.

FIG. 3 is a block diagram of switch control circuitry 30 according to at least one example embodiment. As described above with reference to FIG. 1, the switch control circuitry 30 of FIG. 3 may receive the diode voltage $V_D$ and the reference voltage $V_{REF}$, and may generate the control signal CTR. As shown in FIG. 3, the switch control circuitry 30 may include a comparator 32, a delay circuit 34, and/or an inverter 36, but is not limited thereto. In other example embodiments, the switch control circuitry 30 may include processing circuitry such as a hardware/software combination such as at least one processor executing software; or a combination of hardware circuitry and at least one processor executing software. For example, the control circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. Hereinafter, FIG. 3 will be described with reference to FIG. 1.

According to at least one example embodiment, the comparator 32 may receive the diode voltage $V_D$ and the reference voltage $V_{REF}$, and may generate a comparison signal CMP based on the diode voltage $V_D$ with the reference voltage $V_{REF}$ and/or by comparing the diode voltage $V_D$ with the reference voltage $V_{REF}$. The comparator 32 may have any structure, may provide correction of offset in some example embodiments, and may include an amplifier with a chopper in some example embodiments, but is not limited thereto. Herein, the comparison signal CMP is assumed to have a low level voltage when the diode voltage $V_D$ is higher than the reference voltage $V_{REF}$ and a high level voltage when the diode voltage $V_D$ is lower than the reference voltage $V_{REF}$. However, the example embodiments are not limited thereto.

The delay circuit 34 may receive the comparison signal CMP from the comparator 32, and may generate a first control signal CTR1 by delaying the comparison signal CMP. The delay circuit 34 may have any structure and may include a series of delay cells, such as an inverter, etc. As described below with reference to FIG. 5, a delay provided by the delay circuit 34 may be configured to correspond to a charge period (i.e., a duration of a first phase) of the first capacitor C1. In other words, the delay circuit 34 may be configured to and/or designed to delay the comparison signal CMP based on the charge period of the first capacitor C1.

The inverter 36 may generate the second control signal CTR2 by inverting the first control signal CTR1. In order to control switches included in the first switch circuit 11, the first control signal CTR1 and the second control signal CTR2 are generated and/or obtained by inverting the first control signal CTR1, and the control signal CTR may include the first control signal CTR1 and the second control signal CTR2. In some example embodiments, the inverter 36 may be omitted, and the first control signal CTR1 generated by the delay circuit 34 may be generated alone as the control signal CTR.

Figure 4:
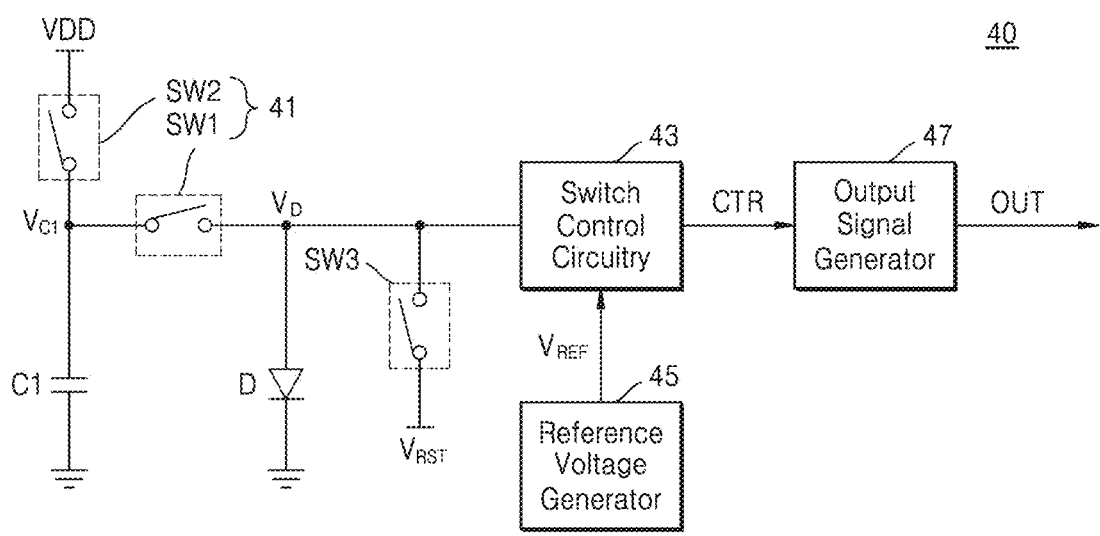
FIG. 4 is a circuit diagram of a temperature sensor according to at least one example embodiment.
Figure 5:
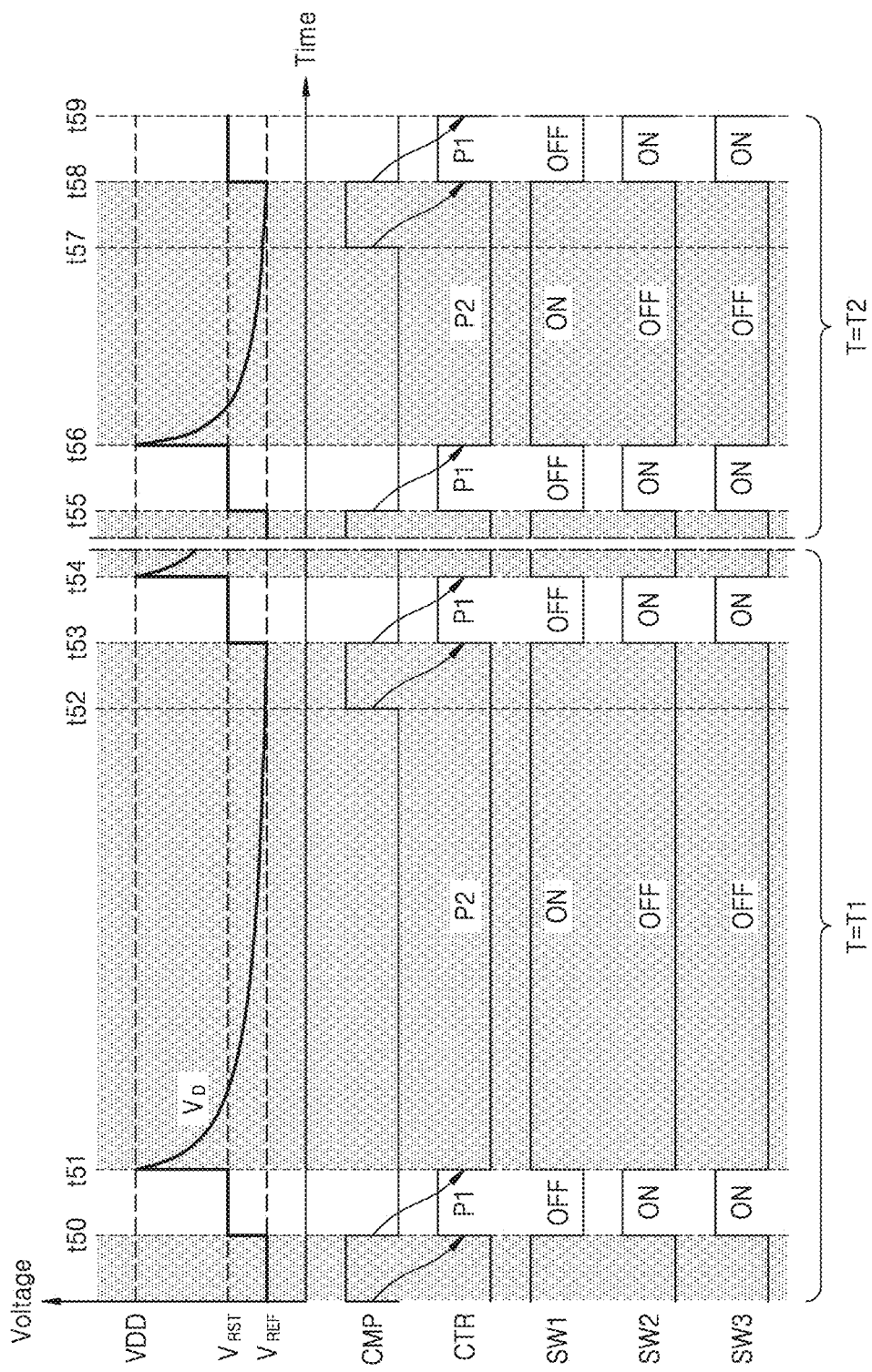
FIG. 5 is a timing diagram illustrating an example of operation of the temperature sensor of FIG. 4 according to at least one example embodiment.

FIG. 4 is a circuit diagram of a temperature sensor 40 according to at least one example embodiment, and FIG. 5 is a timing diagram illustrating an example of operation of the temperature sensor 40 of FIG. 4 according to at least one example embodiment. Hereinafter, descriptions provided above in relation to FIG. 1 will be omitted herein to avoid redundancy.

Referring to FIG. 4, similar to the temperature sensor 10 of FIG. 1, the temperature sensor 40 may include the first capacitor C1, the diode D, a first switch circuit 41, switch control circuitry 43, a reference voltage generator 45, and/or an output signal generator 47, etc., but is not limited thereto. In addition, the temperature sensor 40 may further include a third switch SW3, and the first switch circuit 41 may include a first switch SW1 and a second switch SW2. Although not shown, the first switch SW1, the second switch SW2, and the third switch SW3 may receive the control signal CTR, and may be turned on or off according to and/or based on the control signal CTR. The first switch SW1, the second switch SW2, and the third switch SW3 may have any structure, and may include, for example, an n-channel field effect transistor (NFET) and/or a p-channel field effect transistor (PFET) having a gate for receiving the control signal CTR, etc.

The control signal CTR may have a first phase P1 and a second phase P2 that are alternately repeated. The first phase P1 may correspond to a period in which the first capacitor C1 is charged with the positive supply voltage VDD, but is not limited thereto. For example, in FIG. 5, the first phase P1 corresponding to the control signal CTR of a high level voltage may occur between time t50 and time t51, and the first switch SW1 may be turned off in the first phase P1 but the second switch SW2 and the third switch SW3 may be turned on. Accordingly, the first capacitor C1 may be charged with the positive supply voltage VDD, while an anode of the diode D may be connected to a reset node to which a reset voltage $V_{RST}$ is supplied by the third switch SW3, and the diode voltage $V_D$ may be same as the reset voltage $V_{RST}$. The reset voltage $V_{RST}$ may be greater than the reference voltage $V_{REF}$, may be a voltage of a desired and/or certain magnitude, that is, a DC voltage, in some example embodiments, and may be a voltage that varies over time in some example embodiments. For example, as shown in FIG. 5, in the first phase P1, the diode voltage $V_D$ may be same voltage level as the reset voltage $V_{RST}$, and the reset voltage $V_{rst}$ may be greater than the reference voltage $V_{REF}$, but the example embodiments are not limited thereto and other voltage levels may be used for the diode voltage $V_D$, the reset voltage $V_{RST}$, and/or the reference voltage $V_{REF}$.

As described above with reference to FIG. 3, a duration of the first phase P1 may be determined based on a delay provided by a delay circuit included in the switch control circuitry 43. For example, as shown in FIG. 5, the comparison signal CMP may have a rising edge before time t50 due to the diode voltage $V_D$ and the reference voltage $V_{REF}$. Due to the rising edge of the comparison signal CMP, the control signal CTR may have a rising edge at time t50, and a falling edge of the comparison signal CMP may be generated due to the diode voltage $V_D$ which has the same voltage level as the reset voltage $V_{RST}$ due to the start of the first phase P1. Due to the falling edge of the comparison signal CMP, the control signal CTR may have a falling edge at time t51, whereby the first phase P1 may be terminated. Similarly, due to the rising edges of the comparison signal CMP generated at times t52 and t57, rising edges of the control signal CTR may be generated at times t53 and t58, respectively. Also, due to the falling edges of the comparison signal CMP generated at times t53 and t58, falling edges of the control signal CTR may be generated at times t54 and t59, respectively. Accordingly, the first phase P1 may occur between times t53 and t54 and between times t55 and t56, respectively. As a result, a duration of the first phase P1 may correspond to a delay from the comparison signal CMP to the control signal CTR and may be kept constant. In FIG. 5, the duration of the first phase P1 may be exaggerated for the sake of convenience of illustration, and the example embodiments are not limited thereto.

The second phase P2 may correspond to a period in which the first capacitor C1 is discharged through the diode D. For example, in FIG. 5, the second phase P2 corresponding to the control signal CTR of a low level voltage may occur between time t51 and time t53, and the first switch SW1 may be turned on in the second phase P2 but the second switch SW2 and the third switch SW3 may be turned off. Accordingly, the first capacitor C1 and the diode D may be connected in parallel, and the charge stored in the first capacitor C1 may move to a ground node (e.g., discharge) through the diode D. Accordingly, the diode voltage $V_D$ may be lowered from the positive supply voltage VDD to a ground level. Similarly, the second phase P2 may occur at times t56 and t58.

As described above with reference to FIGS. 2A and 2B, a discharge curve at a relatively low temperature may have a relatively high voltage, and thus, as shown in FIG. 5, a duration of the second phase P2 at the first temperature T1, that is, the length from time t51 to time t53, may be longer than the duration of the second phase P2 at the second temperature T2, that is, the length from time t56 to time t58. As described above, since the first phase P1 has a constant duration, a frequency of the control signal CTR may be higher at the second temperature T2 than at the first temperature T1. Accordingly, the output signal generator 47 may generate the output signal OUT (e.g., the temperature reading, etc.) by measuring the frequency of the control signal CTR.

Figure 6:
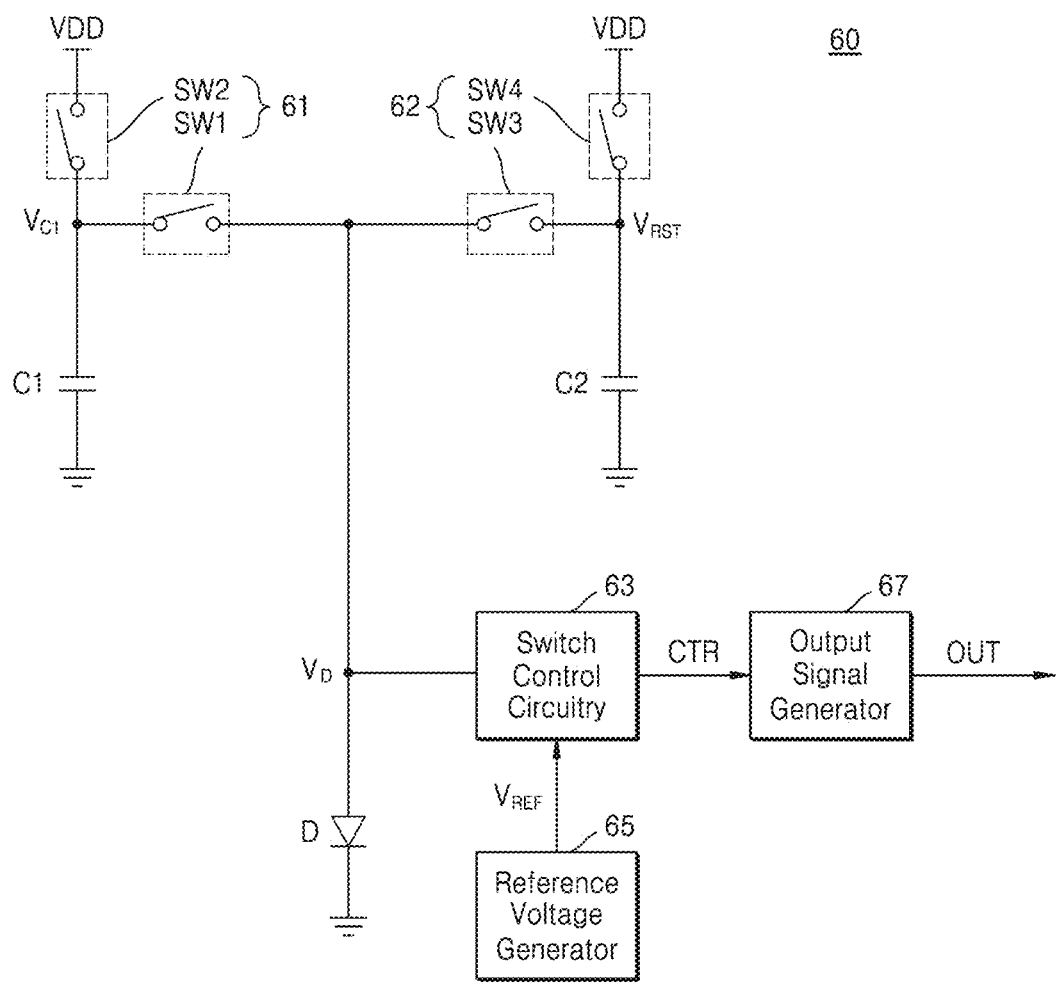
FIG. 6 is a circuit diagram of a temperature sensor according to at least one example embodiment.
Figure 7:
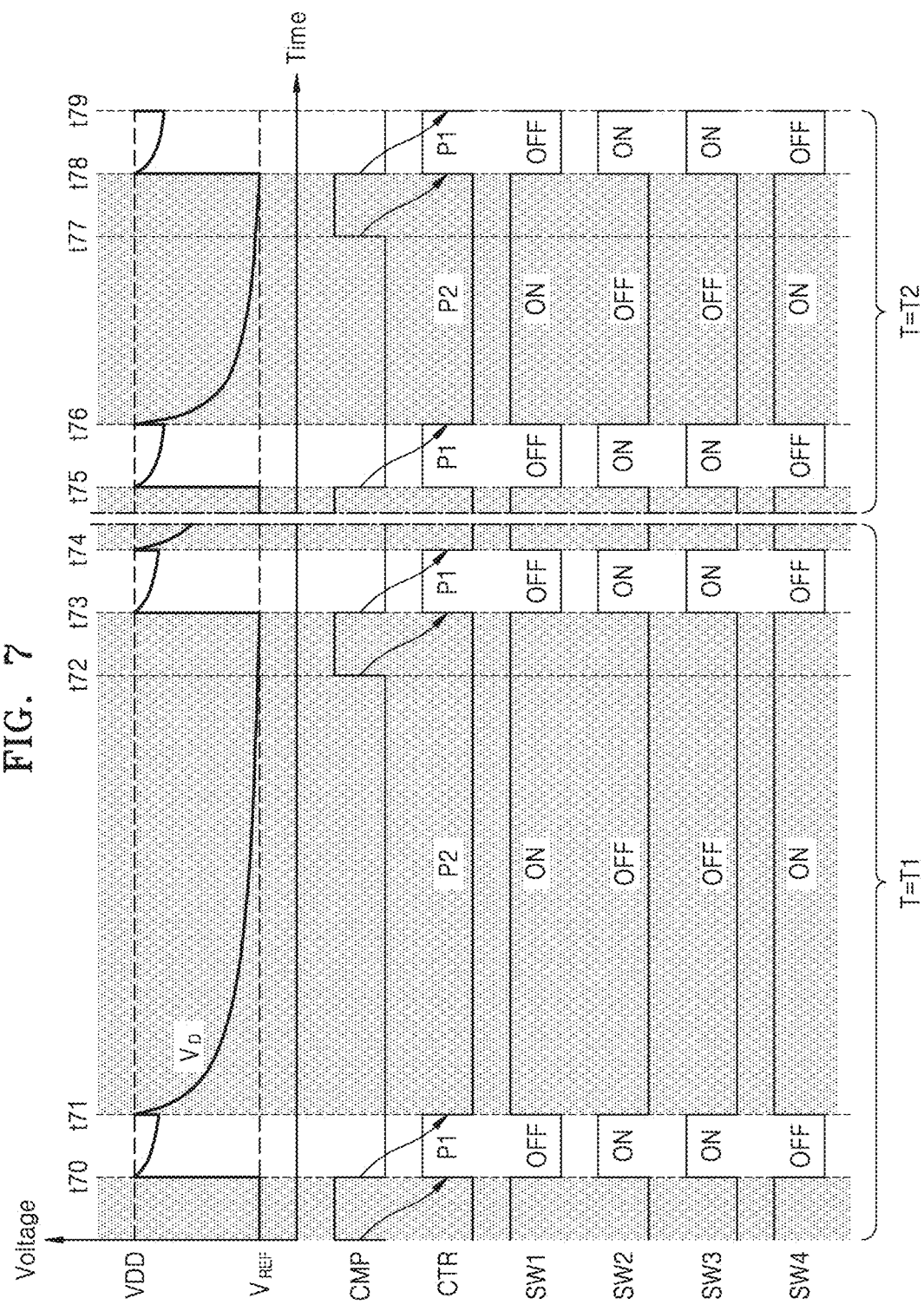
FIG. 7 is a timing diagram illustrating an example of operation of the temperature sensor of FIG. 6 according to at least one example embodiment.

FIG. 6 is a circuit diagram of a temperature sensor 60 according to at least one example embodiment, and FIG. 7 is a timing diagram illustrating an example of operation of the temperature sensor 60 of FIG. 6 according to at least one example embodiment. Hereinafter, descriptions provided above in relation to FIGS. 1 and 5 will be omitted herein to avoid redundancy.

Referring to FIG. 6, similar to the temperature sensor 10 of FIG. 1, the temperature sensor 60 may include the first capacitor C1, the diode D, a first switch circuit 61, switch control circuitry 63, a reference voltage generator 65, and/or an output signal generator 67, but is not limited thereto. In addition, the temperature sensor 60 may further include a second capacitor C2 and a second switch circuit 62, and the second switch circuit 62 may include a third switch SW3 and a fourth switch SW4, but is not limited thereto. Although not shown, the first switch SW1, the second switch SW2, the third switch SW3, and the fourth switch SW4 may receive the control signal CTR and may be turned on or off according to (and/or based on) the control signal CTR. The first switch SW1, the second switch SW2, the third switch SW3, and the fourth switch SW4 may have any structure, and may include, for example, an NFET and/or a PFET having a gate for receiving the control signal CTR, etc.

The control signal CTR may have a first phase P1 and a second phase P2 that are alternately repeated, similar to FIG. 5 as described above, but is not limited thereto. Compared with the temperature sensor 40 of FIG. 4, the diode voltage $V_D$ may have a same voltage level as the reset voltage $V_{RST}$ that varies over time during the first phase P1. For example, as shown in FIG. 6, the anode of the diode D in the first phase P1 may be connected to the second capacitor C2 that is charged with the positive supply voltage VDD in the second phase P2 by the third switch SW3. Accordingly, the diode D may be connected to the second capacitor C2 in the first phase P1, and may be connected to the first capacitor C1 in the second phase P2.

Referring to FIG. 7, the first phase P1 corresponding to the control signal CTR of a high level voltage may occur between time t70 and time t71, and the first switch SW1 and the fourth switch SW4 may be turned off in the first phase P1 but the second switch SW2 and the third switch SW3 may be turned on, but the example embodiments are not limited thereto. Accordingly, the first capacitor C1 may be charged with the positive supply voltage VDD, while the anode of the diode D may be connected to a reset node to which the reset voltage $V_{RST}$ is supplied by the third switch SW3. Accordingly, the diode D and the second capacitor C2 may be connected in parallel, and as the second capacitor C2 is discharged, the diode voltage $V_D$ may gradually decrease as shown in FIG. 7.

The comparison signal CMP may have a falling edge due to the diode voltage $V_D$ rising based on the positive supply voltage VDD at time t70. Accordingly, the control signal CTR may have a falling edge at time t71, and the first phase P1 may be terminated. Similarly, due to the rising edges of the comparison signal CMP generated at times t72 and t77, rising edges of the control signal CTR may be generated at times t73 and t78, respectively. Also, due to the falling edges of the comparison signal CMP generated at times t73 and t78, falling edges of the control signal CTR may be generated at times t74 and t79, respectively. Accordingly, the first phase P1 may occur between times t73 and t74 and between times t75 and t76, respectively. In FIG. 7, the duration of the first phase P1 may be exaggerated for the sake of convenience of illustration, and the example embodiments are not limited thereto.

The second phase P2 corresponding to a low voltage level of the control signal CTR may occur between time t71 and time t73, the first switch SW1 may be turned on in the second phase P2, and the second switch SW2 and the third switch SW3 may be turned off. Accordingly, the second capacitor C2 may be charged with the positive supply voltage VDD, while the first capacitor C1 and the diode D may be connected in parallel, and charge stored in the first capacitor C1 may move to a ground node (e.g., discharge) through the diode D. Accordingly, the diode voltage $V_D$ may be lowered from the positive supply voltage VDD to a ground level. Similarly, the second phase P2 may occur at times t76 and t78.

As shown in FIG. 7, the duration of the second phase P2 at the first temperature T1, that is, the length from time t71 to time t73, may be longer than the duration of the second phase P2 at the second temperature T2, that is, the length from time t76 to time t78. Since the first phase P1 has a constant duration, the frequency of the control signal CTR may be higher at the second temperature T2 than at the first temperature T1.

Figure 8:
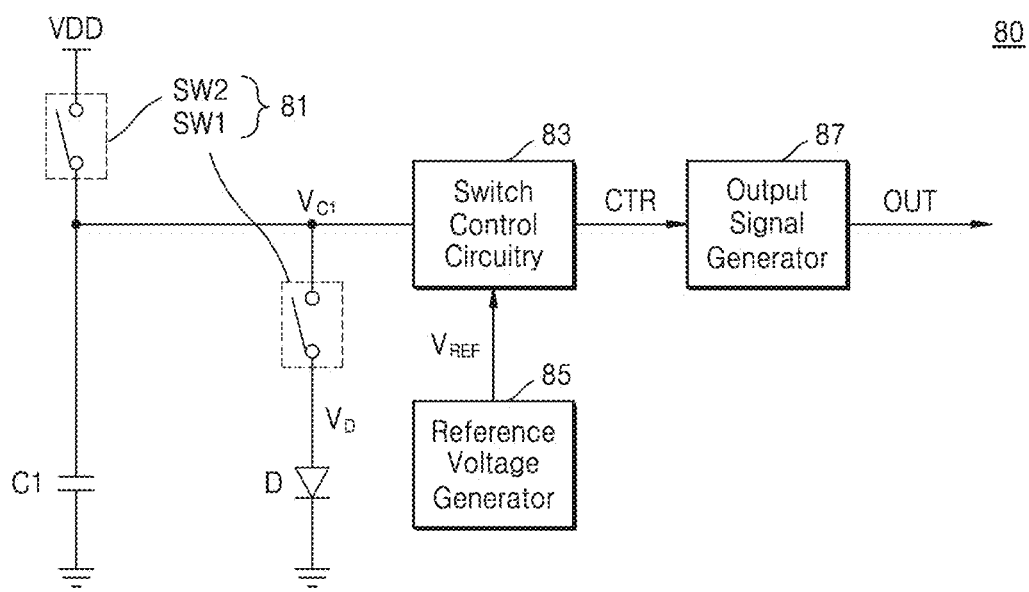
FIG. 8 is a circuit diagram of a temperature sensor according to at least one example embodiment.
Figure 9:
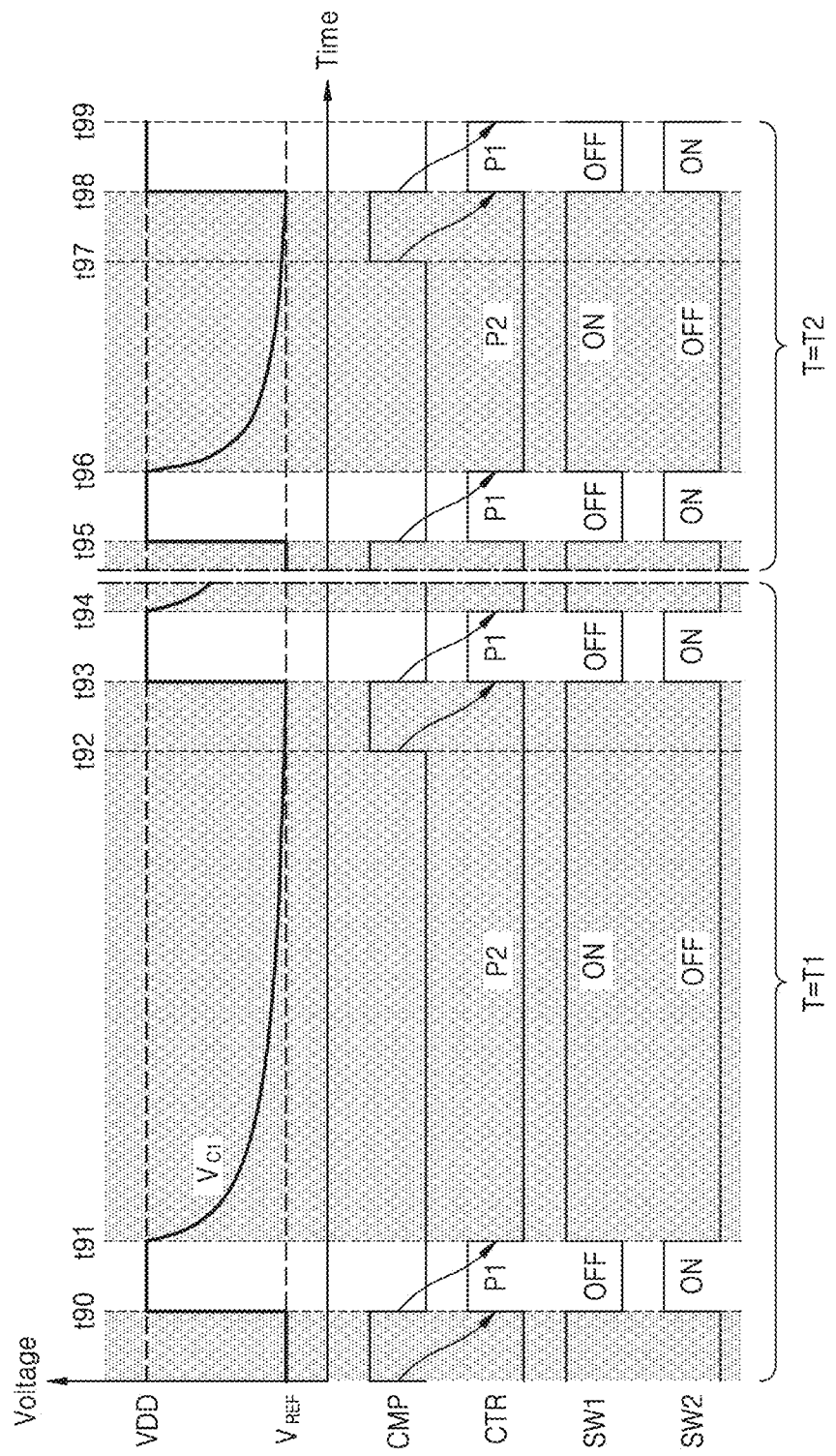
FIG. 9 is a timing diagram illustrating an example of operation of the temperature sensor of FIG. 8 according to at least one example embodiment.

FIG. 8 is a circuit diagram of a temperature sensor 80 according to at least one example embodiment, and FIG. 9 is a timing diagram illustrating an example of operation of the temperature sensor 80 of FIG. 8 according to at least one example embodiment. Hereinafter, descriptions provided above in relation to FIGS. 1 and 5 will be omitted to avoid redundancy.

Referring to FIG. 8, similar to the temperature sensor 10 of FIG. 1, the temperature sensor 80 may include the first capacitor C1, the diode D, a first switch circuit 81, switch control circuitry 83, a reference voltage generator 85, and/or an output signal generator 87, etc., and the first switch circuit 81 may include a first switch SW1 and a second switch SW2. Although not shown, the first switch SW1 and the second switch SW2 may receive the control signal CTR and may be turned on or off according to the control signal CTR. The first switch SW1 and the second switch SW2 may have any structure, and may include, for example, an NFET and/or a PFET having a gate for receiving the control signal CTR, etc. As shown in FIG. 8, the switch control circuitry 83 may receive a discharge voltage of the first capacitor C1, that is, the first capacitor voltage $V_{C1}$, instead of the diode voltage $V_D$, and may compare the first capacitor voltage $V_{C1}$ with the reference voltage $V_{REF}$.

The control signal CTR may have a first phase P1 and a second phase P2 that are alternately repeated, similar to the control signal CTR described above with reference to FIG. 5. Compared with the temperature sensor 40 of FIG. 4, the anode of the diode D may be floated during the first phase P1. For example, as shown in FIG. 8, during the first phase P1, the anode of the diode D may be floated by the first switch SW1 that is in an off state.

Referring to FIG. 9, the first phase P1 corresponding to the control signal CTR of a high level voltage may occur between time t90 and time t91, and the first switch SW1 may be turned off in the first phase P1 but the second switch SW2 may be turned on, but the example embodiments are not limited thereto. Accordingly, the first capacitor C1 may be charged with the positive supply voltage VDD during the first phase P1, while the anode of the diode D may be floated by the first switch SW1. Accordingly, the first capacitor voltage $V_{C1}$ may be maintained to be equal to the positive supply voltage VDD during the first phase P1.

The comparison signal CMP may have a falling edge due to the diode voltage $V_{C1}$ rising based on the positive supply voltage VDD at time t90. Accordingly, the control signal CTR may have a falling edge at time t91, and the first phase P1 may be terminated. Similarly, due to the rising edges of the comparison signal CMP generated at times t92 and t97, rising edges of the control signal CTR may be generated at times t93 and t98, respectively. Also, due to the falling edges of the comparison signal CMP generated at times t93 and t98, falling edges of the control signal CTR may be generated at times t94 and t99, respectively. Accordingly, the first phase P1 may occur between times t93 and t94, and between times t95 and t97, respectively. In FIG. 9, the duration of the first phase P1 may be exaggerated for the sake of convenience of illustration, and the example embodiments are not limited thereto.

The second phase P2 corresponding to the control signal CTR of a low voltage level may occur between time t91 and time t93, and the first switch SW1 may be turned on in the second phase P2 but the second switch SW2 may be turned off, but is not limited thereto. Accordingly, the first capacitor C1 and the diode D may be connected in parallel, and charge stored in the first capacitor C1 may move to a ground node (e.g., discharge) through the diode D. Accordingly, the first capacitor voltage $V_{C1}$ may be lowered from the positive supply voltage VDD during the second phase P2. Similarly, the second phase P2 may occur at times t96 and t98.

As shown in FIG. 9, the duration of the second phase P2 at the first temperature T1, that is, the length from time t91 to time t93, may be longer than the duration of the second phase P2 at the second temperature T2, that is, the length from time t96 to time t98. Since the first phase P1 has a constant duration, the frequency of the control signal CTR may be higher at the second temperature T2 than at the first temperature T1.

Figure 10A:
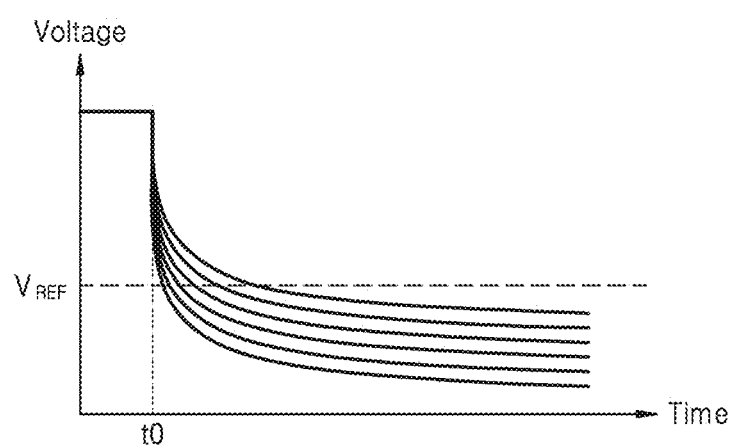
FIGS. 10A to 10C are graphs illustrating examples of reference voltages according to at least one example embodiment.
Figure 10B:
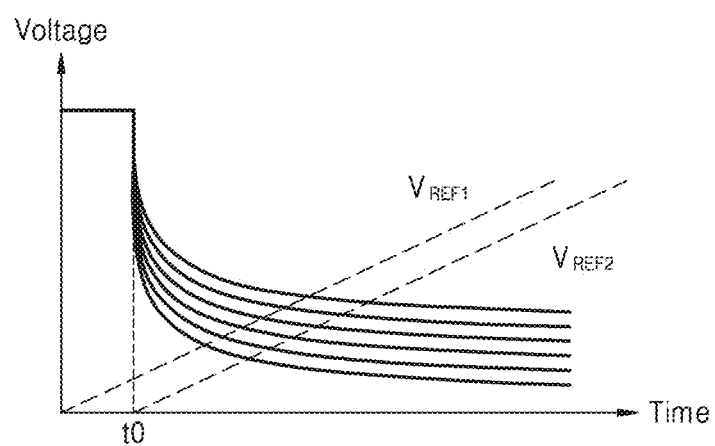
Figure 10C:
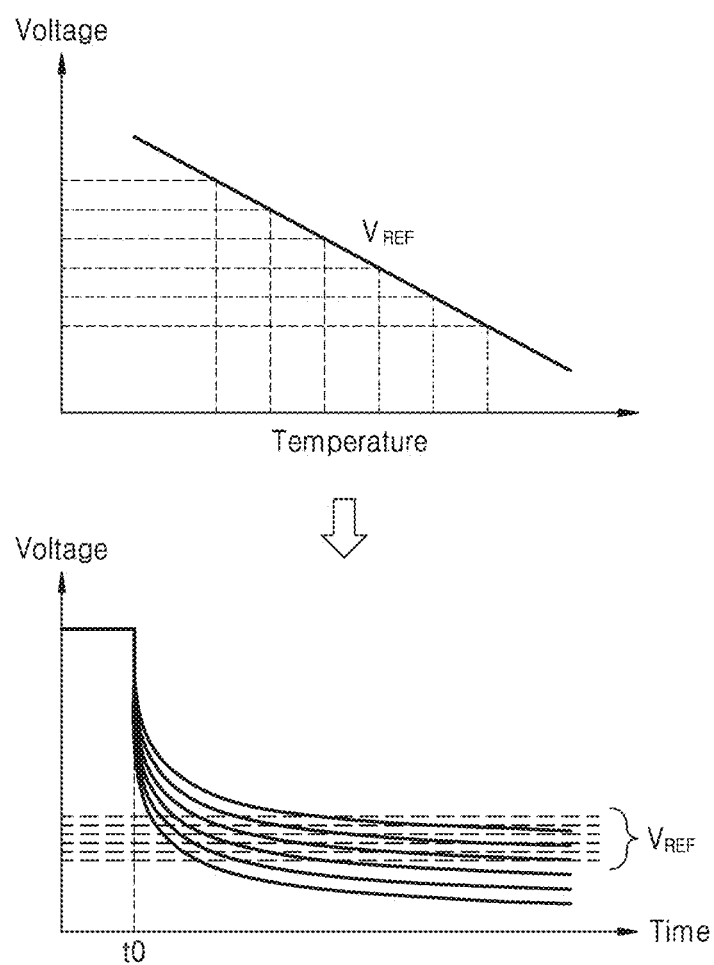

FIGS. 10A to 10C are graphs illustrating examples of the reference voltages $V_{REF}$ according to at least one example embodiment. In more detail, each of the graphs of FIGS. 10A to 10C shows discharge curves of a diode-capacitor corresponding to different temperatures and a reference voltage. Hereinafter, FIGS. 10A to 10C will be described with reference to FIG. 1.

Referring to FIG. 10A, the reference voltage generator 15 may generate the reference voltage $V_{REF}$ having a desired and/or certain magnitude. For example, as shown in FIG. 10A, the reference voltage $V_{REF}$ may be a DC voltage and may be compared with a discharge voltage that gradually decreases after time t0. As shown in FIG. 10A, a discharge curve may vary with temperature, and a length from time t0 to a point in time at which a discharge curve and the reference voltage $V_{REF}$ intersect may vary with (and/or be based on) the temperature. The magnitude of the reference voltage $V_{REF}$ may be determined based on a range in which the discharge curve varies with the temperature.

Referring to FIG. 10B, the reference voltage generator 15 may generate the reference voltage $V_{REF}$ that varies with time. For example, as shown in FIG. 10B, the reference voltage generator 15 may generate a ramp voltage that increases gradually. The reference voltage generator 15 may generate a first reference voltage $V_{REF1}$ that starts to increase before time t0 in some example embodiments, and may generate a second reference voltage $V_{REF2}$ that starts to increase from time t0 in some example embodiments. As shown in FIG. 10B, a length from time t0 to a point in time where the discharge curve and the first reference voltage $V_{REF1}$ or the second reference voltage $V_{REF2}$ intersect may vary with the temperature.

Referring to FIG. 10C, the reference voltage generator 15 may generate the reference voltage $V_{REF}$ that varies with the temperature. For example, as shown in the left graph of FIG. 10C, the reference voltage generator 15 may generate the reference voltage $V_{REF}$ that decreases as the temperature increases, and like the reference voltage $V_{REF}$ of FIG. 10C, a voltage which decreases as the temperature increases may be referred to as a complementary to absolute temperature (CTAT) voltage. In some example embodiments, the reference voltage generator 15 may generate the reference voltage $V_{REF}$ that decreases linearly with an increasing temperature. Accordingly, as shown by dashed lines in the right graph of FIG. 10C, the reference voltage $V_{REF}$ may vary with (and/or be based on) the temperature. The magnitude and a variation range of the reference voltage $V_{REF}$ (i.e., the slope and offset of a line representing the reference voltage $V_{REF}$ in the top graph of FIG. 10C) may be determined based on a variation range of a temperature curve. Hereinafter, an example of the reference voltage generator 15 for generating the reference voltage $V_{REF}$ as the CTAT voltage will be described below with reference to FIG. 11.

Figure 11:
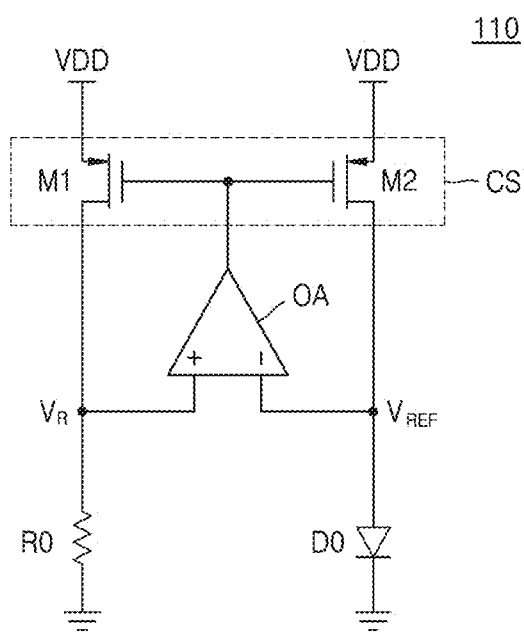
FIG. 11 is a circuit diagram of a reference voltage generator according to at least one example embodiment.

FIG. 11 is a circuit diagram of a reference voltage generator 110 according to at least one example embodiment. In more detail, the circuit diagram of FIG. 11 is an example of the reference voltage generator 15 of FIG. 1 and shows a reference voltage generator 110 that generates the reference voltage $V_{REF}$, which is a CTAT voltage, as described above with reference to FIG. 10C. As shown in FIG. 11, the reference voltage generator 110 may include a resistor R0, a diode D0, an operational amplifier OA, and/or a current source circuit CS, etc. It is noted that the reference voltage generator 15 of FIG. 1 is not limited to that shown in FIG. 11 and may have any other structure. Hereinafter, FIG. 11 will be described with reference to FIG. 10C.

The diode D0 may have a cathode coupled to a ground node, and may have an anode coupled to an inverting input of the operational amplifier OA and a second transistor M2 of the current source circuit CS, but is not limited thereto. The reference voltage $V_{REF}$ may be generated at the anode of the diode D0. The resistor R0 may have a first end coupled to the ground node, and may have a second end coupled to a non-inverting input of the operational amplifier OA and a first transistor M1 of the current source circuit CS, but is not limited thereto. As shown in FIG. 11, a voltage of the second end of the resistor R0 may be referred to as a resistance voltage $V_R$.

The first transistor M1 of the current source circuit CS may have a gate coupled to an output node of the operational amplifier OA, and may control the magnitude of a current provided to the resistor R0 from the positive supply voltage VDD according to (and/or based on) the output voltage of the operational amplifier OA, but is not limited thereto. Similarly, the second transistor M2 of the current source circuit CS may have a gate coupled to the output node of the operational amplifier OA, and may control the magnitude of a current provided to the diode D0 from the positive supply voltage VDD according to (and/or based on) the output voltage of the operational amplifier OA, but is not limited thereto. In some example embodiments, the operational amplifier OA may be an amplifier with a chopper, etc.

At the diode D0, when the current passing through the diode D0 is constant, a voltage of the anode may decrease as the temperature increases, and when the voltage of the anode is constant, the current passing through the diode D0 may decrease as the temperature increases. When the reference voltage $V_{REF}$ varies with a temperature change, the current provided to the resistor R0 and the current provided to the diode D0 may be controlled by the operational amplifier OA such that the resistance voltage $V_R$ follows (and/or corresponds with) the reference voltage $V_{REF}$. The magnitude of the current provided to the resistor R0 and the magnitude of the current provided to the diode D0 may depend on (and/or be based on) a magnitude ratio of the first transistor M1 and the second transistor M2 of the current source circuit CS, and the magnitude ratio of the first transistor M1 and the second transistor M2 may be determined based on the offset of a straight line of the reference voltage $V_{REF}$ in the left graph of FIG. 10C. The reference voltage generator 110 may generate only the CTAT voltage, as shown in FIG. 11, but is not limited thereto. Accordingly, in order to generate both the CTAT voltage and a proportional to absolute temperature (PTAT) voltage, dynamic element matching (DEM) desired and/or required to accurately achieve a current ratio provided by the current source circuit CS may be omitted, and as a result, the reference voltage generator 110 may have a small physical area and low power consumption, etc.

Figure 12:
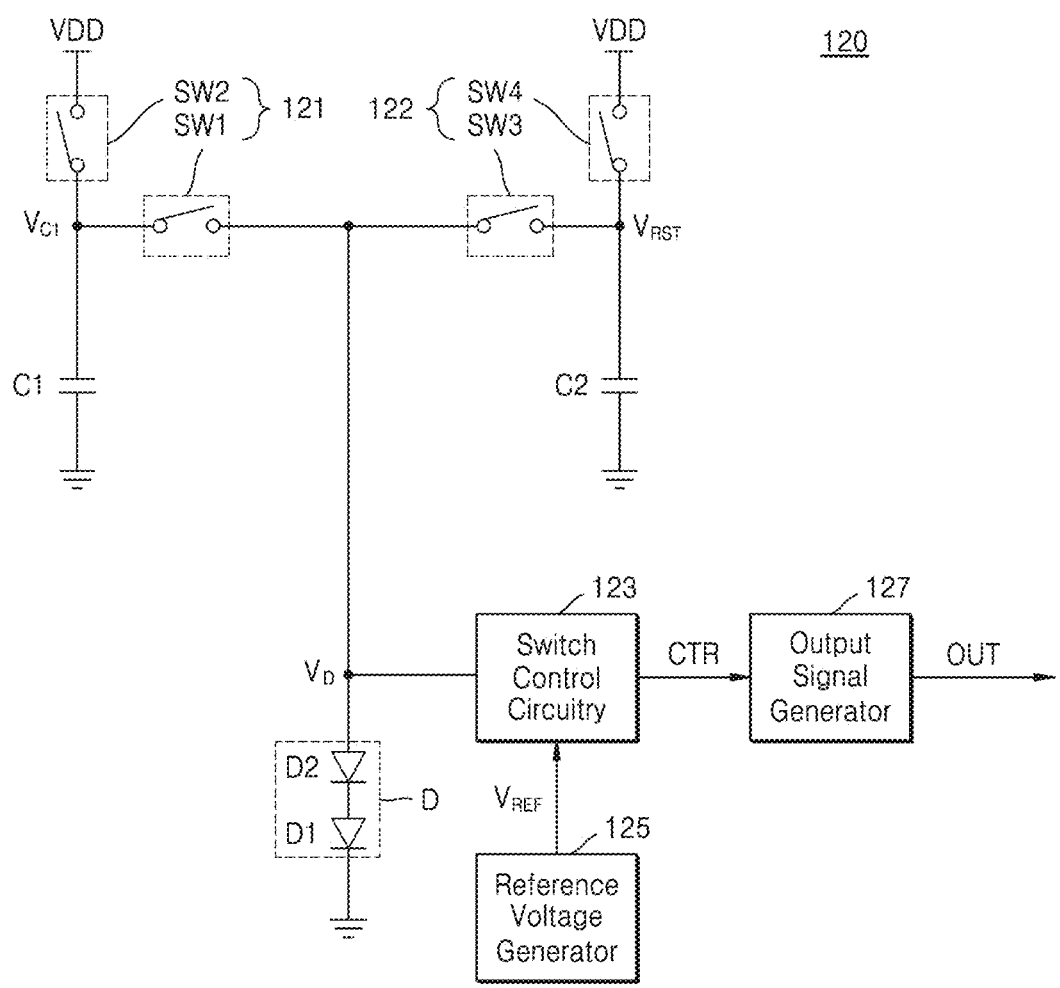
FIG. 12 is a circuit diagram of a temperature sensor according to at least one example embodiment.

FIG. 12 is a block diagram of a temperature sensor 120 according to at least one example embodiment. In more detail, FIG. 12 shows the temperature sensor 120 including two or more series-coupled diode devices. Similar to the temperature sensor 60 of FIG. 6, the temperature sensor 120 may include the first capacitor C1, the second capacitor C2, the diode D, a first switch circuit 121, a second switch circuit 122, switch control circuitry 123, a reference voltage generator 125, and/or an output signal generator 127, but is not limited thereto. In addition, the first switch circuit 121 may include a first switch SW1 and a second switch SW2, and the second switch circuit 122 may include a third switch SW3 and a fourth switch SW4, but the example embodiments are not limited thereto. Hereinafter, descriptions provided above in relation to FIG. 6 will be omitted herein to avoid redundancy.

The diode D may include two or more diode devices coupled in series. For example, as shown in FIG. 12, the diode D may include a first diode device D1 and a second diode device D2 coupled in series, etc. In some example embodiments, the first diode device D1 and the second diode device D2 may have the same structure, but is not limited thereto. The number of series-coupled diode devices included in the diode D may be determined based on a variation range of a discharge curve with temperature. For example, as the number of series-coupled diode devices increases, the position of the discharge curve corresponding to the first temperature T1 in the graph of FIG. 2A may rise upward, and the interval of the discharge curves shown in FIG. 2A may be wider. Accordingly, in order to adjust a variation range of the diode voltage $V_D$ to correspond to the reference voltage $V_{REF}$, the temperature sensor 120 may include two or more diode devices coupled in series, and thus the switch control circuitry 123 may more easily compare the diode voltage $V_D$ with the reference voltage $V_{REF}$.

Figure 13:
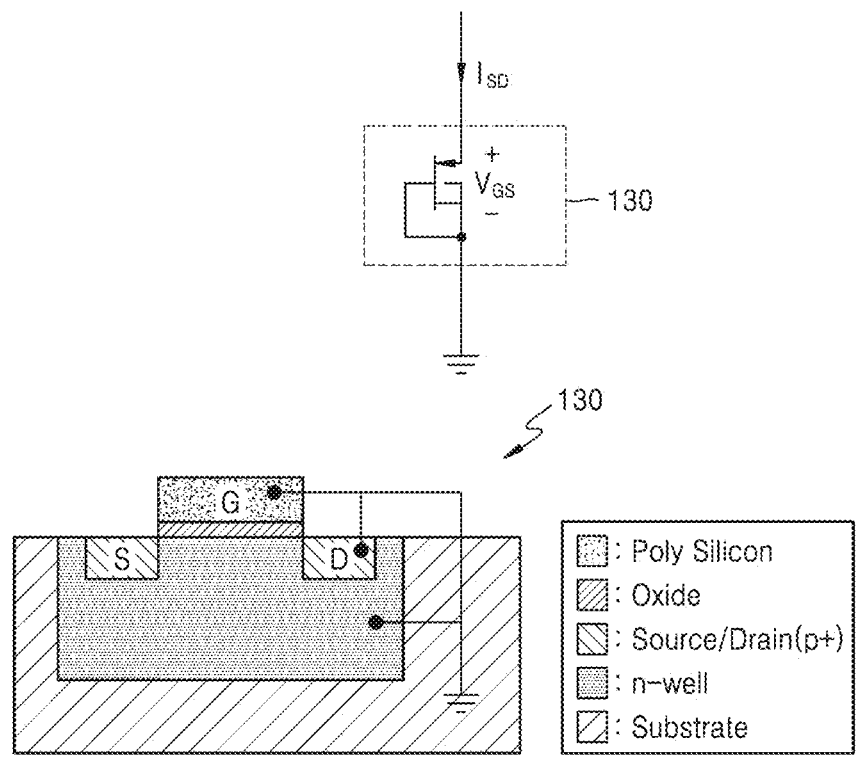
FIG. 13 is a circuit diagram and a layout diagram of a diode included in a temperature sensor according to at least one example embodiment.

FIG. 13 is a circuit diagram and a layout diagram of a diode included in a temperature sensor according to at least one example embodiment. In more detail, a circuit diagram of a diode 130 is shown at the top of FIG. 13 and a layout of the diode 130 is shown at the bottom of FIG. 13.

In some example embodiments, the diode 130 may be implemented with a dynamic threshold voltage MOSFET (DTMOS). For example, as shown in FIG. 13, a body, a drain, and gate of a P-type DTMOS commonly connected to a ground node may function as a cathode of the diode 130, while a source of the P-type DTMOS may function as an anode of the diode 130. Accordingly, the diode 130 may be easily implemented in a complementary metal-oxide-semiconductor (CMOS) process and may contribute to the high accuracy of a temperature sensor due to a low sensitivity to threshold voltage variation by the diode 130. Further, in some example embodiments, the magnitude of the DTMOS may be determined based on the slope of a discharge curve. For example, as the magnitude of the DTMOS increases, the discharge curve in the graph of FIG. 2A may descend more radically after time t0. In some example embodiments, the diode D0 of FIG. 11 may also include the DTMOS.

Figure 14:
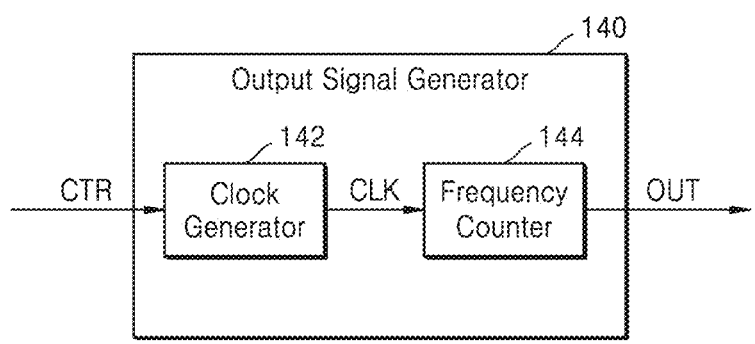
FIG. 14 is a block diagram of an output signal generator according to at least one example embodiment.
Figure 15:
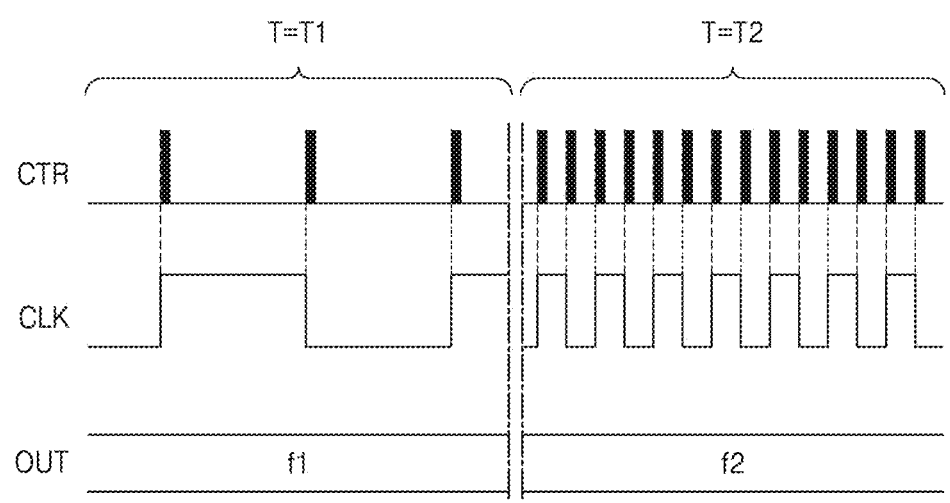
FIG. 15 is a timing diagram illustrating an example of operation of an output signal generator according to at least one example embodiment.

FIG. 14 is a block diagram of an output signal generator according to at least one example embodiment, and FIG. 15 is a timing diagram illustrating an example of operation of an output signal generator according to at least one example embodiment. As described above with reference to FIG. 1, the output signal generator 140 may generate the output signal OUT having a value corresponding to a temperature sensed and/or measured by the temperature sensor 10 based on the control signal CTR. Hereinafter, FIGS. 14 and 15 will be described with reference to FIG. 1.

Referring to FIG. 14, the output signal generator 140 may include a clock generator 142 and/or a frequency counter 144, but is not limited thereto. As described above with reference to the drawings, a frequency of the control signal CTR may vary with temperature due to the duration of the second phase P2 which varies with the temperature. Accordingly, the output signal generator 140 may measure the frequency of the control signal CTR and generate the output signal OUT having a measured frequency, or a value obtained by processing the measured frequency, which corresponds to the sensed and/or measured temperature.

The clock generator 142 may generate a clock signal CLK from the control signal CTR. For example, as shown in FIG. 15, the clock generator 142 may generate the clock signal CLK that transitions (or is toggled) in response to a rising edge of the control signal CTR. The rising edge of the control signal CTR may be generated more frequently at the second temperature T2 that is higher than the first temperature T1, and thus the clock signal CLK may have a higher frequency at the second temperature T2 than the first temperature T1. In some example embodiments, the clock generator 142 may include a toggle flip-flop that receives the control signal CTR, but is not limited thereto.

The frequency counter 144 may receive the clock signal CLK from the clock generator 142 and generate the output signal OUT by measuring a frequency of the clock signal CLK. For example, the frequency counter 144 may count the rising edges and/or falling edges of the clock signal CLK for a desired and/or predefined time, and may generate the output signal OUT having the counted value. For example, as shown in FIG. 15, the output signal OUT may have a digital value f1 representing a relatively low frequency of the clock signal CLK at the first temperature T1 as a multi-bit signal while having a digital value f2 representing a relatively high frequency of the clock signal CLK at the second temperature T2, but is not limited thereto.

Figure 16:
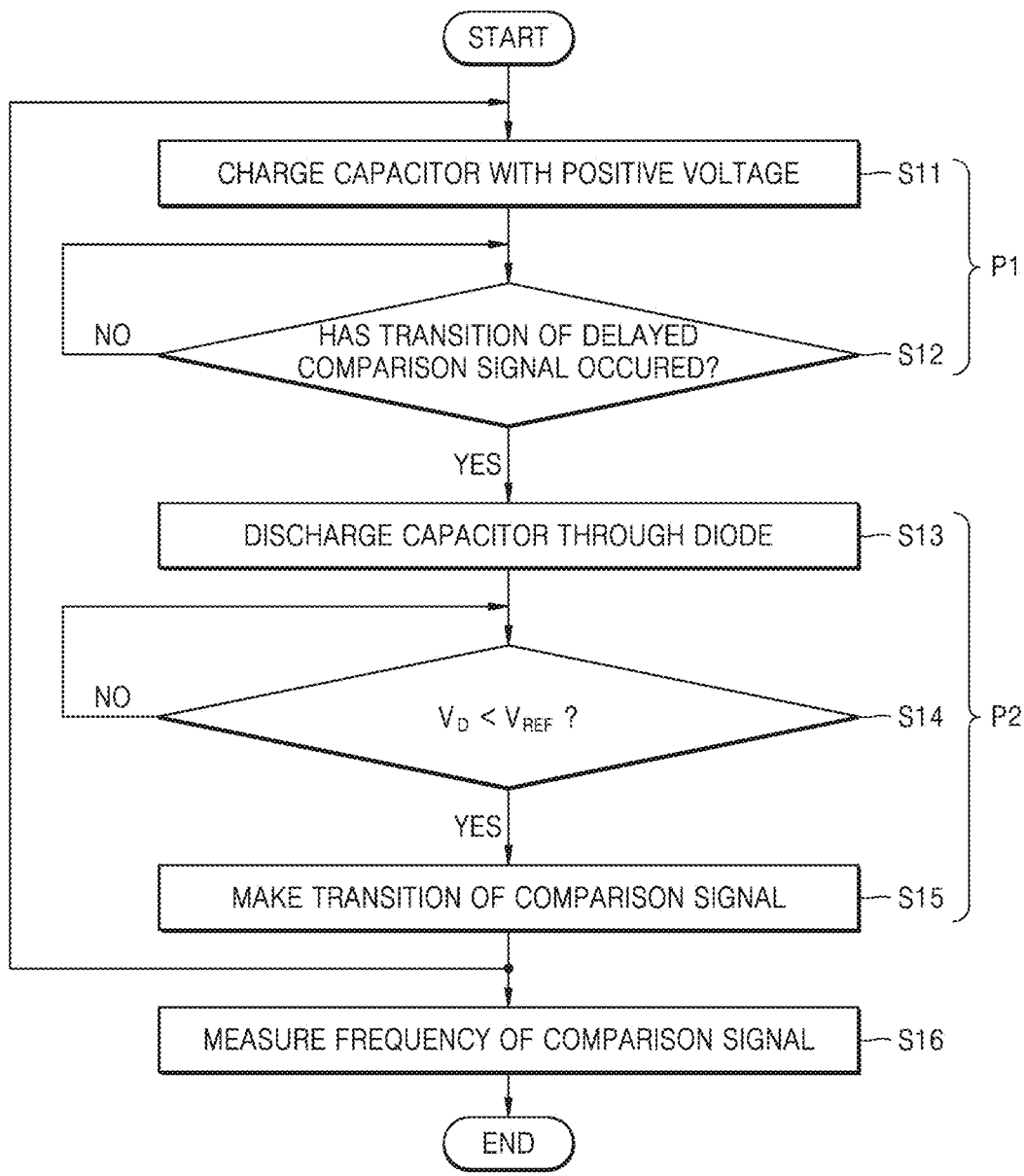
FIG. 16 is a flowchart illustrating a method of sensing a temperature according to at least one example embodiment.

FIG. 16 is a flowchart illustrating a method of sensing a temperature according to at least one example embodiment. In some example embodiments, the method of FIG. 16 may be performed by the temperature sensor 10 of FIG. 1 and may be referred to as an operating method of the temperature sensor 10. As shown in FIG. 16, the method of sensing a temperature may include a plurality of operations S11, S12, S13, S14, S15, and S16, and operations S11 and S12 may be performed in the first phase P1 and operations S13, operation S14, and operation S15 may be performed in the second phase P2. In the description of FIG. 16, it is assumed that the switch control circuitry 13 of FIG. 1 includes the components of the switch control circuitry 30 of FIG. 3, which will be described with reference to FIGS. 1 and 3, but the example embodiments are not limited thereto and the switch control circuitry 13 may have alternative structure(s).

In operation S11, an operation of charging a capacitor with a positive voltage may be performed. For example, the first switch circuit 11 may connect the first capacitor C1 to the positive supply voltage VDD according to the control signal CTR, and thus the first capacitor C1 may be charged with the positive supply voltage VDD. In addition, in some example embodiments, the reset voltage $V_{RST}$ may be provided to the diode D.

In operation S12, it may be determined whether a transition of a delayed comparison signal has occurred. In the second phase P2 preceding the first phase P1, the comparator 32 included in the switch control circuitry 13 may generate the comparison signal CMP based on, and/or by comparing, the diode voltage $V_D$ with the reference voltage $V_{REF}$, and the delay circuit 34 may delay the comparison signal CMP for a desired period of time. The delayed comparison signal CMP may correspond to the control signal CTR, and when transition of the control signal CTR occurs, that is, when a desired and/or certain time has elapsed after the first phase P1 is started, the first phase P1 may be terminated. Thereafter, operation S13 may be performed as shown in FIG. 16.

In operation S13, an operation of discharging the capacitor through the diode D may be performed. For example, the first switch circuit 11 may connect the first capacitor C1 to the diode D according to the control signal CTR, and thus charge stored in the first capacitor C1 may move to a ground node (e.g., discharge) through the diode D. As described above with reference to FIGS. 2A and 2B, the diode voltage $V_D$ (or the discharge voltage of the first capacitor C1) may decrease independently of the voltage charged in the first capacitor C1 in the first phase P1, and may decrease differently based on the temperature. In addition, the diode voltage $V_D$ may decrease logarithmically.

In operation S14, an operation of comparing the diode voltage $V_D$ with the reference voltage $V_{REF}$ may be performed. For example, the comparator 32 included in the switch control circuitry 13 may compare the diode voltage $V_D$ with the reference voltage $V_{REF}$ generated by the reference voltage generator 15. When the diode voltage $V_D$ decreases below the reference voltage $V_{REF}$, operation S15 may be subsequently performed as shown in FIG. 16. In some example embodiments, the comparator 32 may generate the comparison signal CMP having a low voltage level (e.g., a first voltage level) when the diode voltage $V_D$ is greater than the reference voltage $V_{REF}$, and a high voltage level (e.g., a second voltage level) when the diode voltage $V_D$ is lower than the reference voltage $V_{ref}$, but the example embodiments are not limited thereto, and for example, the comparison signal CMP may have a high voltage level when the diode voltage $V_D$ is greater than the reference voltage $V_{REF}$, etc. In some example embodiments, as described above with reference to FIG. 8, the discharge voltage of the first capacitor C1, that is, the first capacitor voltage $V_{C1}$, may be compared with the reference voltage $V_{REF}$.

In operation S15, an operation of transitioning the comparison signal CMP may be performed. For example, the comparator 32 may transition the comparison signal CMP when the diode voltage $V_D$ becomes lower than the reference voltage $V_{REF}$, but is not limited thereto. In some example embodiments, the comparator 32 may generate the comparison signal CMP having a rising edge when the diode voltage $V_D$ becomes lower than the reference voltage $V_{REF}$, but the example embodiments are not limited thereto. Accordingly, the second phase P2 may be terminated, and as shown in FIG. 16, the first phase P1 may be repeated.

In operation S16, an operation of measuring a frequency of the comparison signal CMP may be performed. For example, the control signal CTR generated by the delay circuit 34 of the switch control circuitry 13 by delaying the comparison signal CMP may have the same frequency as the comparison signal CMP. The output signal generator 17 may generate the output signal OUT by measuring the frequency of the control signal CTR.

Figure 17:
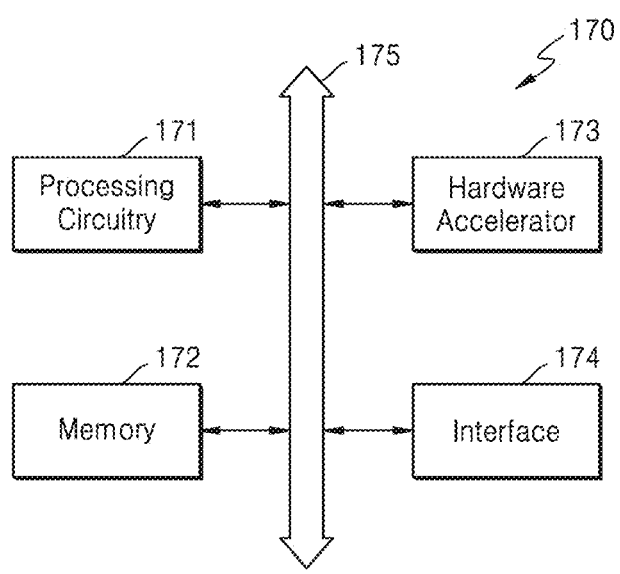
FIG. 17 is a block diagram illustrating a system including a temperature sensor according to at least one example embodiment.

FIG. 17 is a block diagram of a system 170 including a temperature sensor according to at least one example embodiment. In some example embodiments, the system 170 may be a system-on-chip as an integrated circuit manufactured through a semiconductor process, but is not limited thereto. As shown in FIG. 17, the system 170 may include at least one processing circuitry 171, a memory 172, a hardware accelerator 173, an interface 174, and/or a bus 175, etc. The at least one processing circuitry 171, the memory 172, the hardware accelerator 173, and the interface 174 may communicate with each other via the bus 175.

The at least one processing circuitry 171 may include processing circuitry such as hardware including logic circuits; a hardware/software combination such as at least one processor core executing software and/or executing any instruction set; or a combination thereof. For example, the processing circuitry more specifically may include, but is not limited to, a central processing unit (CPU), an arithmetic logic unit (ALU), a digital signal processor (DSP), a graphics processing unit (GPU), a communication process (CP), a microcomputer, a field programmable gate array (FPGA), a System-on-Chip (SoC), a programmable logic unit, a microprocessor, application-specific integrated circuit (ASIC), etc. The at least one processing circuitry 171 may access the memory 172 through the bus 175 and execute computer readable instructions stored in the memory 172.

The memory 172 may be a non-transitory computer readable medium, and may include volatile memory such as static random access memory (SRAM), dynamic random access memory (DRAM), etc., and may include nonvolatile memory such as flash memory, phase-change random access memory (PRAM), etc. The memory 172 may store instructions executed by the at least one processing circuitry 171, may store data generated by the at least one processing circuitry 171 or the hardware accelerator 173, or may store data received from the outside via the interface 174.

The hardware accelerator 173 may refer to a hardware block designed to perform a specific function, and may be referred to as a hardware intellectual property (IP) or IP blocks. The at least one processing circuitry 171 may allow the hardware accelerator 173 to perform a specific task, and the hardware accelerator 173 may generate output data by processing input data stored in the memory 172 and store the output data in the memory 172.

The interface 174 may form a communication channel with the outside of the system 170. For example, the interface 174 may transmit the data stored in the memory 172 from the outside through a communication channel or store data received from the outside in the memory 172 through the communication channel.

A temperature sensor according to at least one example embodiment may be disposed in at least one of the components included in the system 170. The components included in system 170 may provide different performance depending on (and/or based on) the temperature and may have high temperatures during operation due to heat generation by the component(s) of the system 170. As described above with reference to the drawings, a temperature may be sensed in different portions of the system 170 by the temperature sensor with high accuracy, high resolution, a wide measurement range, low power consumption, and/or a small physical area, etc. As a result, the performance and efficiency of the system 170 may be improved.

While various example embodiments of the inventive concepts have been particularly shown and described with reference to example embodiments thereof, it will be understood that various changes in form and details may be made therein without departing from the spirit and scope of the following claims.

What is claimed is:

1. A temperature sensor configured to generate an output signal corresponding to a sensed temperature, the temperature sensor comprising:
   a diode including a cathode coupled to a ground node;
   a first capacitor including a first end coupled to the ground node;
   a switch circuit configured to connect a second end of the first capacitor to a positive voltage node or an anode of the diode based on a control signal, the switch circuit including,
   a first switch coupled between the second end of the first capacitor and the positive voltage node, and
   a second switch coupled between the second end of the first capacitor and the anode of the diode;
   switch control circuitry configured to generate the control signal based on a reference voltage and a voltage of the anode of the diode; and
   an output signal generator configured to generate the output signal based on a frequency of the control signal.

2. The temperature sensor of claim 1, further comprising:
   a reference voltage generator configured to generate a DC voltage or a ramp voltage as the reference voltage, the ramp voltage rising over time in response to the control signal.

3. The temperature sensor of claim 1, wherein the output signal generator comprises:
   a clock signal generator configured to generate a clock signal based on an edge of the control signal; and
   a frequency counter configured to measure a frequency of the clock signal.

4. The temperature sensor of claim 1, wherein
   the diode comprises a plurality of diode devices coupled in series.

5. The temperature sensor of claim 1, wherein
the diode comprises a P-type dynamic threshold voltage MOSFET (DTMOS) including a body, a drain and a gate that are connected to the cathode of the diode.

6. The temperature sensor of claim 1, further comprising:
a reference voltage generator configured to generate a complementary to absolute temperature (CTAT) voltage that decreases as the sensed temperature rises, as the reference voltage.

7. The temperature sensor of claim 6, wherein the reference voltage generator comprises:
a second diode including a cathode and an anode, the cathode of the second diode coupled to the ground node and the anode of the second diode configured to generate the reference voltage;
a resistor including a first end coupled to the ground node;
an operational amplifier configured to amplify a voltage of the second end of the resistor and a voltage of the anode of the second diode; and
a bias circuit configured to supply current to the resistor and the second diode based on an output of the operational amplifier.

8. The temperature sensor of claim 1, wherein the switch control circuitry comprises:
a comparator configured to compare the reference voltage and the voltage of the anode of the diode; and
a delay circuit configured to generate the control signal by delaying an output signal of the comparator.

9. The temperature sensor of claim 8, wherein
the switch control circuitry further comprises an inverter configured to generate an inverted control signal from the control signal.

10. The temperature sensor of claim 1, further comprising:
a third switch configured to connect the anode of the diode to a reset node based on the control signal while the second end of the first capacitor is connected to the positive voltage node.

11. The temperature sensor of claim 10, further comprising:
a second capacitor including a first end and a second end, the first end of the second capacitor coupled to the ground node and the second end of the second capacitor coupled to the reset node; and
a fourth switch configured to connect the reset node to the positive voltage node based on the control signal while the second end of the first capacitor is connected to the anode of the diode.

12. The temperature sensor of claim 10, wherein the reset node is configured to receive a voltage greater than the reference voltage.

13. A temperature sensor configured to generate an output signal corresponding to a sensed temperature by switching between a first phase and a second phase, the temperature sensor comprising:
a first capacitor and a diode;
a first switch circuit configured to charge the first capacitor to a positive voltage in the first phase, and discharge the first capacitor through the diode in the second phase;
a reference voltage generator configured to generate a reference voltage independent of the discharge of the first capacitor;
switch control circuitry configured to control the first switch circuit and terminate the second phase based on a discharge voltage of the first capacitor and the reference voltage; and
an output signal generator configured to generate the output signal corresponding to the sensed temperature based on a duration of the second phase.

14. The temperature sensor of claim 13, further comprising:
a second switch circuit controlled by the switch control circuitry, the second switch circuit configured to apply a reset voltage to the diode during the first phase.

15. The temperature sensor of claim 13, wherein
the switch control circuitry is configured to keep a duration of the first phase constant; and
the output signal generator is configured to generate the output signal corresponding to the sensed temperature based on a frequency of a control signal representing the first phase and the second phase.

16. A temperature sensor configured to generate an output signal corresponding to a sensed temperature by switching between a first phase and a second phase, the temperature sensor comprising:
a plurality of switches and a diode;
a first capacitor configured to be charged with a positive voltage during the first phase, and discharged through the diode during the second phase, by at least one of the plurality of switches;
a second capacitor configured to be discharged through the diode during the first phase, and charged with the positive voltage during the second phase, by at least one of the plurality of switches;
switch control circuitry configured to maintain a duration of the first phase, and terminate the second phase, based on a reference voltage and a voltage of the first capacitor; and
an output signal generator configured to generate the output signal corresponding to the sensed temperature based on a duration of the second phase.

17. The temperature sensor of claim 16, wherein
the diode and the second capacitor are connected in parallel during the first phase, and the diode and the first capacitor are connected in parallel during the second phase, by the plurality of switches.

18. The temperature sensor of claim 16, further comprising:
a reference voltage generator configured to generate a complementary to absolute temperature (CTAT) voltage that decreases as the sensed temperature rises, as the reference voltage.

19. The temperature sensor of claim 16, further comprising:
a reference voltage generator configured to generate a DC voltage or a ramp voltage as the reference voltage, the ramp voltage rising over time in the second phase.

* * * * *